US012372204B2

(12) United States Patent
Song et al.

(10) Patent No.: US 12,372,204 B2
(45) Date of Patent: Jul. 29, 2025

(54) PRESSURIZING DEVICE OF CRYOGENIC VESSEL AND CRYOGENIC VESSEL

(71) Applicants: NANTONG CIMC ENERGY EQUIPMENT CO., LTD., Jiangsu (CN); CHINA INTERNATIONAL MARINE CONTAINERS (GROUP) CO., LTD., Guangdong (CN); CIMC Enric Investment Holdings (Shenzhen) Co., Ltd., Guangdong (CN)

(72) Inventors: Binjie Song, Jiangsu (CN); Xiaofeng Ju, Jiangsu (CN); Weidong Shen, Jiangsu (CN); Pingan Jiang, Jiangsu (CN); Feng Gu, Jiangsu (CN); Jianbing Gao, Jiangsu (CN); Weifeng Chen, Jiangsu (CN); Yunkai Zhang, Jiangsu (CN); Lei Liu, Jiangsu (CN); Pengfei Xu, Jiangsu (CN); Peipei Zhang, Jiangsu (CN)

(73) Assignees: NANTONG CIMC ENERGY EQUIPMENT CO., LTD., Jiangsu (CN); CHINA INTERNATIONAL MARINE CONTAINERS (GROUP) CO., LTD., Guangdong (CN); CIMC ENRIC INVESTMENT HOLDINGS (SHENZHEN) CO., LTD., Guangdong (CN)

( * ) Notice: Subject to any disclaimer, the term of this patent is extended or adjusted under 35 U.S.C. 154(b) by 0 days.

(21) Appl. No.: 18/564,458

(22) PCT Filed: Apr. 13, 2023

(86) PCT No.: PCT/CN2023/088162
§ 371 (c)(1),
(2) Date: Nov. 27, 2023

(87) PCT Pub. No.: WO2024/087532
PCT Pub. Date: May 2, 2024

(65) Prior Publication Data
US 2024/0295291 A1 Sep. 5, 2024

(30) Foreign Application Priority Data
Oct. 25, 2022 (CN) ......................... 202211311306.X

(51) Int. Cl.
*F17C 1/12* (2006.01)

(52) U.S. Cl.
CPC ........ *F17C 1/12* (2013.01); *F17C 2201/0109* (2013.01); *F17C 2203/0391* (2013.01);
(Continued)

(58) Field of Classification Search
CPC ............................ F17C 1/12; F17C 2203/014; F17C 2203/015; F17C 2203/0304; F17C 2203/0609
See application file for complete search history.

(56) References Cited

U.S. PATENT DOCUMENTS 2,926,810 A * 3/1960 Yeager .................. F17C 13/086 220/648
3,762,175 A * 10/1973 Jones ......................... F17C 3/02 220/560.12
(Continued)

FOREIGN PATENT DOCUMENTS

CN 102635776 8/2012
CN 202912201 5/2013
(Continued)

OTHER PUBLICATIONS

WIPO, International Search Report for PCT/CN2023/088162, Jun. 21, 2023.
(Continued)

*Primary Examiner* — Kevin F Murphy
(74) *Attorney, Agent, or Firm* — Hodgson Russ LLP

(57) ABSTRACT

A cryogenic vessel includes a shell, an inner vessel and a thermal insulation layer arranged on a periphery of the inner vessel, a gap is provided between the shell and the inner vessel to form a sandwich space in a vacuum environment. The pressurizing device includes a fixing member, a protruding member, a heat conducting member, an operating member and a connecting member.

20 Claims, 6 Drawing Sheets

(52) U.S. Cl.
CPC ................. *F17C 2203/0629* (2013.01); *F17C 2223/0161* (2013.01); *F17C 2250/03* (2013.01); *F17C 2250/043* (2013.01)

(56) References Cited

U.S. PATENT DOCUMENTS

| | | | | |
|---|---|---|---|---|
| 4,091,634 | A | 5/1978 | Shepherd | |
| 4,821,907 | A * | 4/1989 | Castles | F17C 13/008 62/46.3 |
| 7,036,323 | B2 | 5/2006 | Schnagl | |
| 9,261,237 | B2 * | 2/2016 | Conaughty | F17C 13/001 |

FOREIGN PATENT DOCUMENTS

| | | |
|---|---|---|
| CN | 107228273 | 10/2017 |
| CN | 112271051 | 1/2021 |
| CN | 214731440 | 11/2021 |
| DE | 10033410 | 5/2002 |
| DE | 102019129740 | 5/2020 |
| JP | 2012072819 | 4/2012 |
| KR | 20220074533 | 6/2022 |
| WO | 2014203530 | 12/2014 |

OTHER PUBLICATIONS

JPO, Office Action for JP Application No. 2023-542866, Dec. 10, 2024.
EPO, Extended European Search Report for EP Application No. 23808648.2, Aug. 22, 2024.

* cited by examiner

PRESSURIZING DEVICE OF CRYOGENIC VESSEL AND CRYOGENIC VESSEL

CROSS-REFERENCE TO RELATED APPLICATIONS

This application is a national stage entry under 37 U.S.C. § 371 of International Application No. PCT/CN2023/088162, filed Apr. 13, 2023, which claims priority to Chinese Patent Application No. 202211311306.X, filed Oct. 25, 2022, the entire disclosures of which are incorporated herein by reference.

TECHNICAL FIELD

The present application relates to the field of pressure vessels, in particular to a pressurizing device for a cryogenic vessel and a cryogenic vessel.

BACKGROUND

Cryogenic vessels refer to vessels for storing liquids (such as liquid nitrogen, liquid oxygen, liquid argon, liquefied natural gas, liquid hydrogen and liquid helium) with boiling point temperature lower than −150° C. At present, the vessel for storing such liquids is generally composed of an inner vessel, a housing, a thermal insulation material and a supporting structure, etc., and a double-layer vessel structure may be formed by the inner vessel and housing. The double-layer structure divides the cryogenic vessel into an inner vessel space, a sandwich space between the inner vessel and the housing and an external environment space.

According to the storage and transportation requirements, internal media in cryogenic vessels often need to be pressurized. In the prior art, heat exchange is generally adopted, where the liquid phase and gas phase of the medium are usually led out to the external environmental space, and the heat is absorbed by the heat exchanger for pressurization. Alternatively, the external medium is introduced into the inner vessel space, where the pressure is controlled by the heat exchanger.

All the above-mentioned pressure control methods implemented by heat exchange require heat exchangers, and also corresponding pipes and valves for control are necessary, which has a complex structure and high cost.

SUMMARY

There are provided a pressurizing device and a cryogenic vessel provided with the pressurizing device according to embodiments of the present disclosure. The technical solution is as below:

According to a first aspect of embodiments of the present disclosure, there is provided a pressurizing device for a cryogenic vessel, the cryogenic vessel comprising a shell, an inner vessel located in the shell, and a thermal insulation layer arranged on a periphery of the inner vessel, a gap being provided between the shell and the inner vessel to form a sandwich space in a vacuum environment, and the thermal insulation layer is spaced apart from the shell, wherein the pressurizing device comprises:

a fixing member located in the sandwich space, fixedly connected to the shell and spaced apart from the inner vessel;

a protruding member located in the sandwich space, fixedly connected to the inner vessel and protruding out of the thermal insulation layer; the protruding member being spaced apart from the fixing member; and the protruding member is made of a low temperature resistant material;

a heat conducting member rotatably connected to the fixing member; and the heat conducting member being made of a low temperature resistant material;

an operating member arranged outside the shell and rotatable relative to the shell; and a connecting member, one end of the connecting member being fixedly connected to the operating member, another end of the connecting member extending into the sandwich space to be fixedly connected to the heat conducting member, and the connecting member capable of driving the heat conducting member to rotate to abut against the protruding member or rotate to be spaced apart from the protruding member in response to rotation of the operating member.

In an embodiment, the connecting member extends into the sandwich space through a mounting member; and the mounting member is located in the sandwich space and is fixed and sealed with the shell, the mounting member is resilient and capable of telescoping within the sandwich space, the connecting member passes through the mounting member and is fixedly connected to an end of the mounting member away from the shell.

According to a second aspect of embodiments of the present disclosure, there is provided a pressurizing device for a cryogenic vessel, the cryogenic vessel comprising a shell, an inner vessel located in the shell, and a thermal insulation layer arranged on a periphery of the inner vessel, a gap being provided between the shell and the inner vessel to form a sandwich space in a vacuum environment, and the thermal insulation layer is spaced apart from the shell, wherein the pressurizing device comprises:

a protruding member located in the sandwich space, fixedly connected to the inner vessel and protruding out of the thermal insulation layer;

a heat conducting member configured to be flexible, one end of the heat conducting member being fixedly connected to the shell, and another end of the heat conducting member capable of moving away from the protruding member or abutting the protruding member; and a connecting member extending into the sandwich space from outside of the shell and being fixedly connected to the heat conducting member, and the connecting member extending outward from the shell;

wherein the connecting member is capable of approaching or moving away from the shell under performance of external force, and drives the heat conducting member to expand and contract away from the protruding member or abut against the protruding member.

According to a third aspect of embodiments of the present disclosure, there is provided a cryogenic vessel comprising a shell, an inner vessel located in the shell, a thermal insulation layer arranged on a periphery of the inner vessel, and a pressurizing device, wherein a gap is provided between the shell and the inner vessel to form a sandwich space in a vacuum environment, the thermal insulation layer is spaced apart from the shell, and the pressurizing device is any one of the pressurizing devices as described above.

DETAILED DESCRIPTION OF THE EMBODIMENTS

Exemplary embodiments embodying the features and advantages of the present disclosure will be described in detail in the following description. It is to be understood that the present disclosure is capable of various variations in different embodiments without departing from the scope of the present disclosure and that the description and illustrations therein are intended to be illustrative in nature and not to limit the present disclosure.

To further illustrate the principle and structure of the present disclosure, preferred embodiments of the present disclosure are described in detail with reference to the accompanying drawings.

The present disclosure provides a cryogenic vessel, which is suitable for storing and transporting liquids with boiling point temperature lower than −150° C.

The cryogenic vessel comprises a shell, an inner vessel arranged in the shell, a thermal insulation layer arranged on a periphery of the inner vessel and a pressurizing device. The pressurizing device increases the pressure in the inner vessel by transferring the heat on the shell to the inner vessel, so as to achieve the purpose of pressurizing. The pressurizing device does not need a heat exchanger and corresponding pipes and valves, and has a simple structure, thereby reducing the cost.

The cryogenic vessel in the present application is described below by way of detailed embodiments.

Embodiment I

Figure 1:
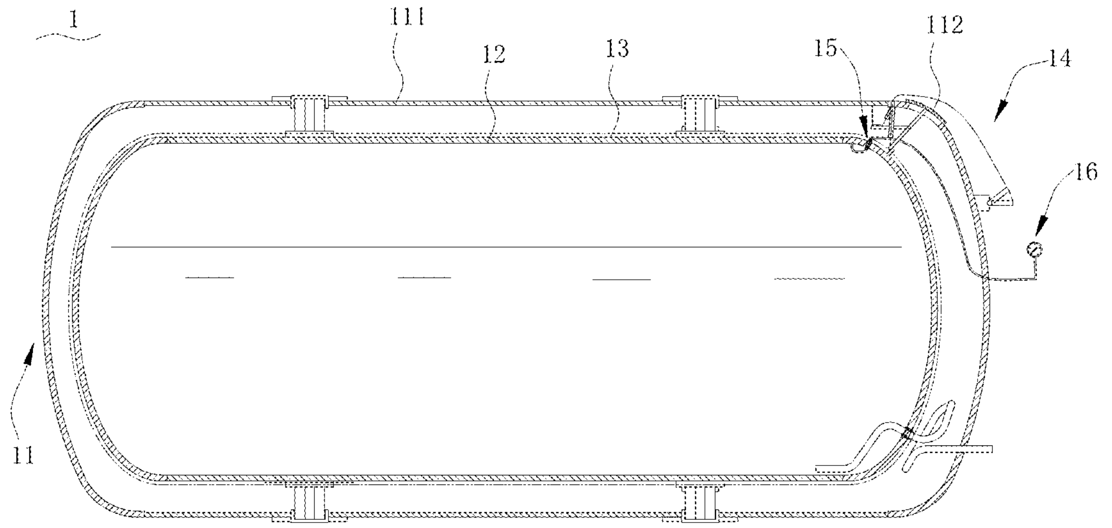
FIG. 1 is a structural schematic illustration of a cryogenic vessel in embodiment I of the present disclosure.
Figure 2:
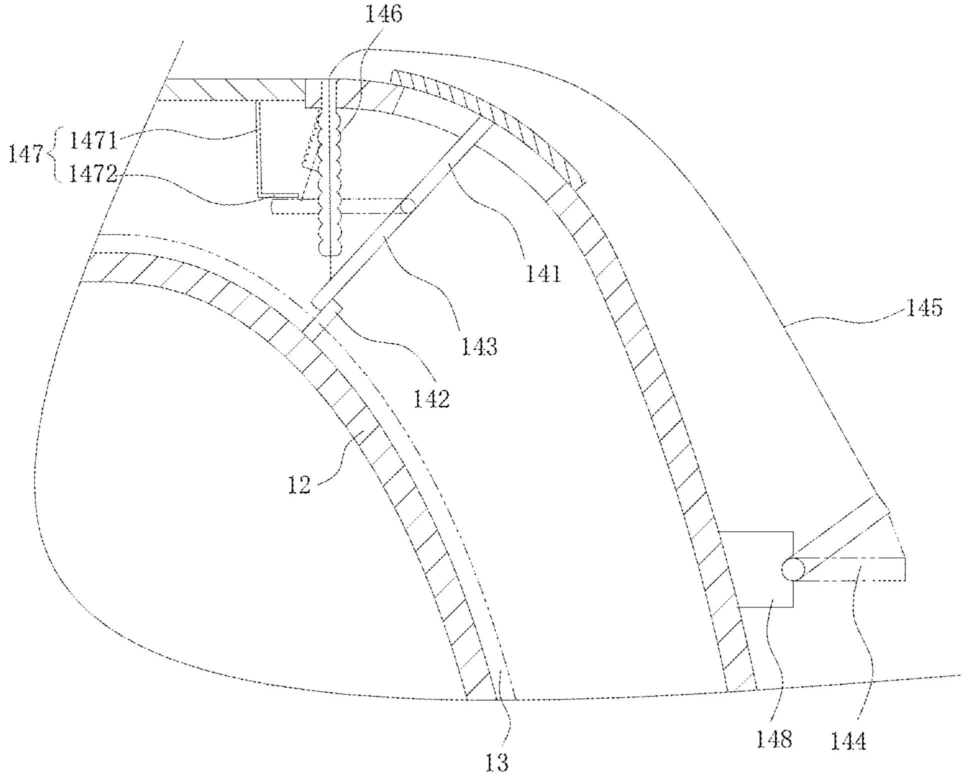
FIG. 2 is a partial structural schematic illustration of the cryogenic vessel in embodiment I of the present disclosure.

FIG. 1 is a structural schematic illustration of the cryogenic vessel in this embodiment, and FIG. 2 is a partial structural schematic illustration of the cryogenic vessel in this embodiment, referring to FIGS. 1 and 2, the cryogenic vessel 1 is of a horizontal type. The horizontal type means that the axis of the cryogenic vessel 1 extends in a horizontal direction during use.

For convenience of description, the axial direction of the cryogenic vessel 1 is defined as a longitudinal direction, and the horizontal direction is defined as a transverse direction perpendicular to the longitudinal direction.

The inner vessel 12 is used for storing cryogenic liquid. In this embodiment, a material of the inner vessel 12 is selected as a low temperature resistant material, in particular austenitic stainless steel.

The shell 11 is wrapped around the outer circumference of the inner vessel 12, and an inner wall of the shell 11 and an outer wall of the inner vessel 12 are spaced to form a sandwich space.

In this embodiment, the shell 11 includes a outer housing 111 and a cover plate 112. The outer housing 111 is provided with at least one opening, and the cover plate 112 is one-to-one corresponding to the opening, and the cover plate 112 is covered at the corresponding opening. The outer housing 111 is made of ordinary carbon steel, and the cover plate 112 is made of a low temperature resistant material such as austenitic stainless steel. The cover plate 112 is welded to the outer housing 111.

The cover plate 112 may be square or circular. When the cover plate 112 is circular, its diameter ranges from 300 mm to 500 mm. When the cover plate 112 is square, its side length ranges from 300 mm to 500 mm.

In other embodiments, the shell 11 does not need openings, and its material is a low temperature resistant material. That is, the entire shell 11 can withstand low temperature.

The sandwich space is a vacuum environment.

The thermal insulation layer 13 is wrapped around the outer circumference of the inner vessel 12, and there is a space between the thermal insulation layer 13 and the inner wall of the shell 11.

The pressurizing device 14 is in communication with the inner vessel 12 and the shell 11, transfers heat from the shell 11 to the inner vessel 12 through heat conduction, and causes the cryogenic liquid in the inner vessel 12 to absorb heat and convert it into gas, thereby increasing the pressure in the inner vessel 12.

The number of pressurizing devices 14 may be set according to actual needs, for example, one, two, three or other number. When a plurality of the pressurizing devices 14 is provided, the plurality of pressurizing devices 14 are arranged at intervals along the circumferential direction of the shell 11. The plurality of pressurizing devices 14 may also be arranged at intervals along the axial direction of the shell 11. The pressurizing device 14 may be positioned according to actual needs to achieve a specific purpose or more precise pressurization control.

The number of the pressurizing devices 14 is set corresponding to the number of the openings, that is, the number of the pressurizing devices 14 coincides with the number of the openings.

Specifically, each of the pressurizing devices 14 includes a fixing member 141, a protruding member 142, a heat conducting member 143, an operating member 144 and a connecting member 145.

The fixing member 141 is located in the sandwich space, fixedly connected to the shell 11, and spaced apart from the inner vessel 12. Specifically, the fixing member 141 is fixedly connected to the inner side of the cover plate 112. The fixing member 141 is made of a low temperature resistant material.

The fixing member 141 may be arranged obliquely or vertically, i.e., included angle between the fixing member 141 and the cover plate 112 may be set according to actual needs.

The protruding member 142 is located in the sandwich space, fixedly connected to the inner vessel 12 and projects out of the thermal insulation layer 13. There is a gap between the protruding member 142 and the fixing member 141, and the protruding member 142 is made of a low temperature resistant material.

The gap between the protruding member 142 and the fixing member 141 refers to a gap in a radial direction of the inner vessel 12.

The heat conducting member 143 and the fixing member 141 are rotatably connected. The heat conducting member 143 is made of a low temperature resistant material. Specifically, a fixing hole is provided at an end of the fixing member 141 away from the shell 11, a connecting hole is provided at one end of the heat conducting member 143, and a rotating shaft is provided in the fixing hole and the connecting hole at the same time, so that the heat conducting member 143 can be rotatably connected to the fixing member 141.

Specifically, the heat conducting member 143 is in the shape of a plate. A width of the heat conducting member 143 is 5% to 20% of a width of the shell 11. Specifically, the width of the heat conducting member 143 is 200 mm to 400 mm. The width is the dimension along the horizontal direction.

When the number of pressurizing devices 14 is plural, the plurality of pressurizing devices 14 may be provided at intervals in the circumferential direction, that is, the plurality of pressurizing devices 14 may be provided in the same area.

A plurality of pressurizing devices 14 are arranged in different areas at intervals along an axial direction.

Accordingly, the fixing member 141 is in a shape of a plate, and its width is adapted to the width of the heat conducting member 143. The protruding member 142 is in a shape of a plate, and its width is adapted to the width of the heat conducting member 143.

The operating member 144 is disposed outside the shell 11 and can be rotated relative to the shell 11. In particular, the operating member 144 is rotatably connected to the shell 11 by means of the fitting member 148. The fitting member 148 is fixed outside the shell 11. One end of the operating member 144 is rotatably connected to the fitting member 148 and another end thereof is fixedly connected to the connecting member 145.

In this embodiment, the fitting member 148 is in the shape of a plate, and the operating member 144 is in the shape of a rod. A fitting hole is provided at the end of the fitting member 148 away from the shell 11, a rotating hole is provided at one end of the operating member 144, and a hinge shaft is provided in the fitting hole and the rotating hole at the same time, so that the operating member 144 can be rotatably connected to the fitting member 148.

One end of the connecting member 145 is fixedly connected to the operating member 144, another end of the connecting member extends into the sandwich space to be fixedly connected to the heat conducting member 143, and the connecting member 145 is capable of driving the heat conducting member 143 to rotate to abut against the protruding member 142 or rotate to be spaced apart from the protruding member 142 in response to rotation of the operating member 144.

The connecting member 145 extends into the sandwich space through the mounting member 146. In particular, the mounting member 146 is located within the sandwich space and is fixedly connected to the shell 11 in a sealing manner. The shell 11 is provided with a through hole, and the mounting member 146 is penetrated into the through hole.

The heat conducting member 143 is hollow inside, an end of the heat conducting member close to the shell 11 is open, and an end of the heat conducting member close to the inner vessel is closed. The mounting member 146 is resilient and capable of telescoping within the sandwich space. In this embodiment, the mounting member 146 is a corrugated pipe.

The connecting member 145 passes through the mounting member 146 and is fixedly connected to the end of the mounting member 146 away from the shell 11. That is, both ends of the connecting member 145 pass through the mounting member 146, and the penetrating ends are fixedly connected to the heat conducting member 143 and the mounting member 146, respectively.

The connecting member 145 can be moved outward by the operating member 144, which causes the mounting member 146 to contract, thereby causing the heat conducting member 143 to rotate. The connecting member 145 can also be moved inward by the operating member 144, so that the mounting member 146 is opened, thereby driving the heat conducting member 143 to rotate.

When the heat conducting member 143 is rotated, the heat conducting member 143 can be rotated to abut against or away from the protruding member 142. When the heat conducting member 143 abuts against the protruding member 142, the heat conducting member 143, the protruding member 142 and the fixing member 141 jointly connect the shell 11 and the inner vessel 12, thereby transferring heat from the shell 11 to the inner vessel 12 through heat conduction, so that the liquid in the inner vessel 12 is vaporized into gas, thereby increasing the pressure of the inner vessel 12.

There is no heat conduction between the shell 11 and the inner vessel 12 when the heat conducting member 143 moves away from the protruding member 142.

In this embodiment, when the heat conducting member 143 abuts against the protruding member 142, the heat conducting member 143 is parallel to the fixing member 141.

The pressurizing device 14 also includes a limiting member 147 located in the sandwich space. The limiting member 147 and the protruding member 142 are arranged on opposite two sides of the fixing member 141, so that the heat conducting member 143 rotates between the limiting member 147 and the protruding member 142.

The mounting member 146 and the limiting member 147 are located on the same side of the fixing member 141.

Therefore, in this embodiment, when the mounting member 146 is in the contracted state, the heat conducting member 143 abuts against the limiting member 147, and when the mounting member 146 is in the expanded state, the heat conducting member 143 abuts against the protruding member 142.

The limiting member 147 is fixedly connected to the shell 11. Specifically, the limiting member 147 includes a fixing part 1471 and a stopping part 1472. The fixing part 1471 is fixedly connected to the shell 11, and the stopping part 1472 is configured to abut against the heat conducting member 143. The stopping part 1472 is abutted by a parallel fit with the heat conducting member 143.

In this embodiment, the stopping part 1472 extends horizontally, and when the heat conducting member 143 rotates to abut against the stopping part 1472, the heat conducting member 143 extends horizontally.

Figure 7:
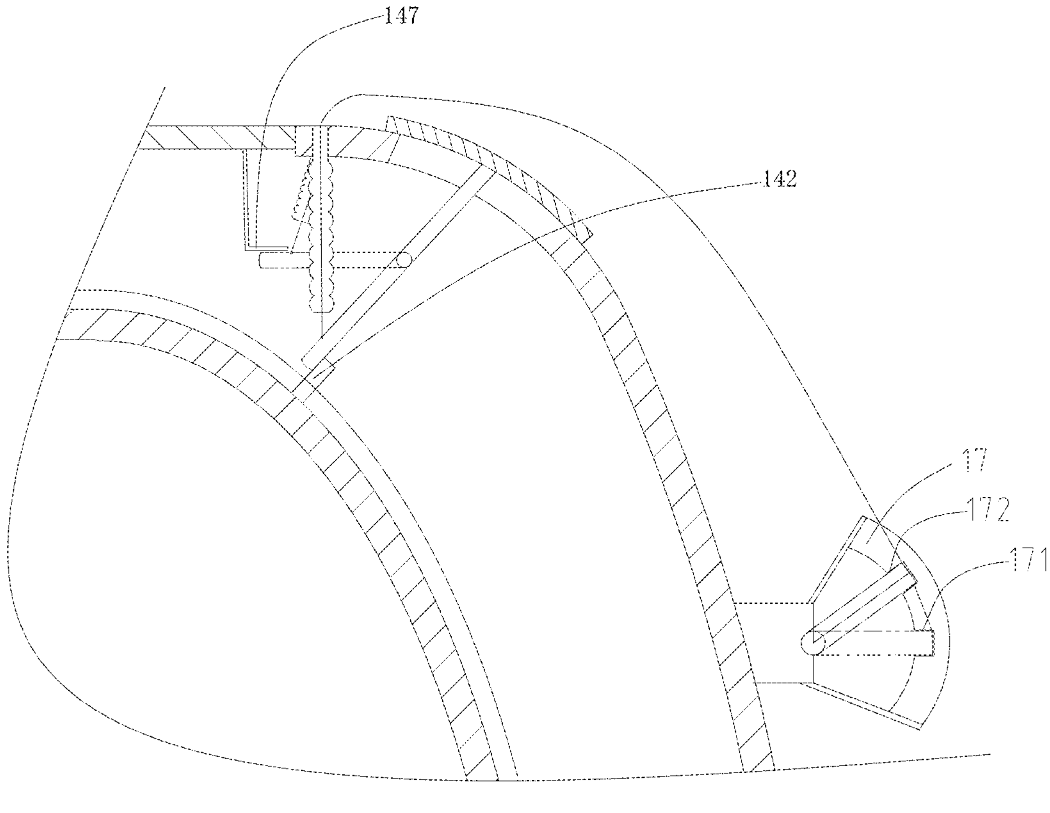
FIG. 7 is a structural schematic illustration of a positioning block of a pressurizing device of the present disclosure.

Referring to FIG. 7, the pressurizing device 14 also comprises a positioning block 17 arranged outside the shell 11, and the positioning block is provided with a first positioning groove 171 and a second positioning groove 172. When the operating member 144 is rotated to be engaged in the first positioning groove 171, the heat conducting member 143 abuts against the limiting member 147, and when the operating member 144 is rotated to be engaged in the second positioning groove 172, the heat conducting member 143 abuts against the protruding member 142.

The pressurizing device 14 includes a pressure measuring device 15 and a pressure display device 16. The pressure measuring device 15 is in communication with the inside of the inner vessel 12 to measure the pressure in the inner vessel 12, and the pressure display device 16 is connected to the pressure measuring device 15 to receive and display the pressure in the inner vessel 12.

The cryogenic vessel 1 is used as follows:

In an initial state, the heat conducting member 143 is disconnected from the protruding member 142.

When the pressure value in the inner vessel 12 displayed by the pressure display device 16 reaches the lower limit value or the pressurization is required in other cases, the heat conducting member 143 is rotated to abut against the protruding member 142 in response to the rotation of the operating member 144, thereby transferring the heat of the shell 11 to the medium in the inner vessel 12, thereby vaporizing the medium and implementing the pressurization function.

In this embodiment, the operating member 144 is rotated upward so that the mounting member 146 is opened, and the heat conducting member 143 is rotated to abut against the protruding member 142.

When the pressure value on the pressure display device 16 reaches the upper limit value, the operating member 144 is rotated so that the heat conducting member 143 moves from the protruding member 142, and heat is no longer transferred to the inner vessel 12.

In this embodiment, the operating member 144 is rotated downward so that the mounting member 146 is contracted and the heat conducting member 143 is rotated to abut against the limiting member 147.

In this embodiment, the shell 11 and the inner vessel 12 of the cryogenic vessel 1 are connected creatively by the rotatable heat conducting member 143 of the pressurizing device 14, which implements the pressurization function by conducting the heat of the shell 11 to the inner vessel 12 and increasing the pressure inside the inner vessel 12 by vaporizing the medium of the inner vessel 12. This pressurization mode does not need additional heat exchanger, and has a simple structure and low cost.

Embodiment II

Figure 3:
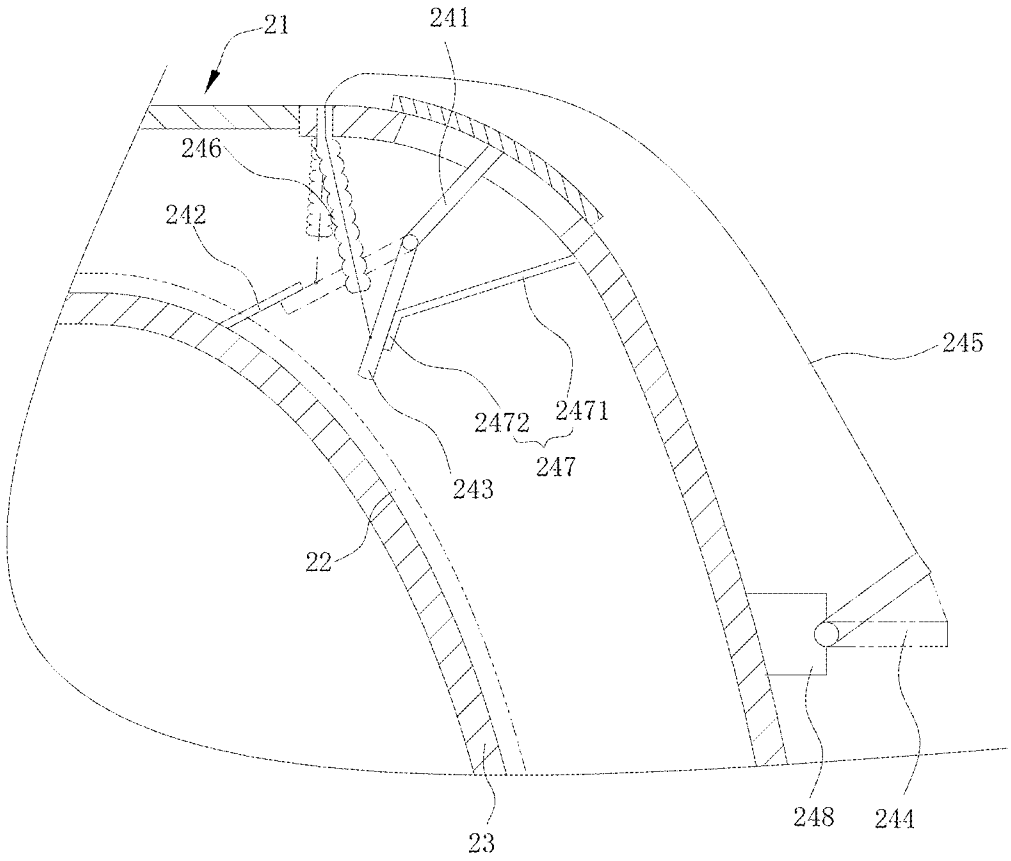
FIG. 3 is a partial structural schematic illustration of the cryogenic vessel in embodiment II of the present disclosure.

FIG. 3 shows a partial structural schematic illustration of the cryogenic vessel in this embodiment. Referring to FIG. 3, this embodiment differs from Embodiment I in the position of the limiting member 247 and the structure of the limiting member 247.

In this embodiment, the protruding member 242 and the mounting member 246 are located on the same side of the fixing member 241, and the limiting member 247 and the mounting member 246 are arranged on opposite two sides of the fixing member.

Both the fixing part 2471 and the stopping part 2472 of the limiting member 247 are arranged obliquely, and an included angle between the fixing part 2471 and the stopping part 2472 is an obtuse angle. The stopping part 2472 is abutted by a parallel fit with the heat conducting member 243.

In this embodiment, when the mounting member 246 is in the contracted state, the heat conducting member 243 abuts against the protruding member 242, and when the mounting member 246 is in the expanded state, the heat conducting member 243 abuts against the limiting member 247.

Other features of the cryogenic vessel in this embodiment, such as the shell 21, the inner vessel 22, the thermal insulation layer 23, the fixing member 241, the protruding member 242, the heat conducting member 243, the operating member 244, the connecting member 245, the mounting member 246, and the fitting member 248, can be referred to Embodiment I and will not be described in detail.

Embodiment III

Figure 4:
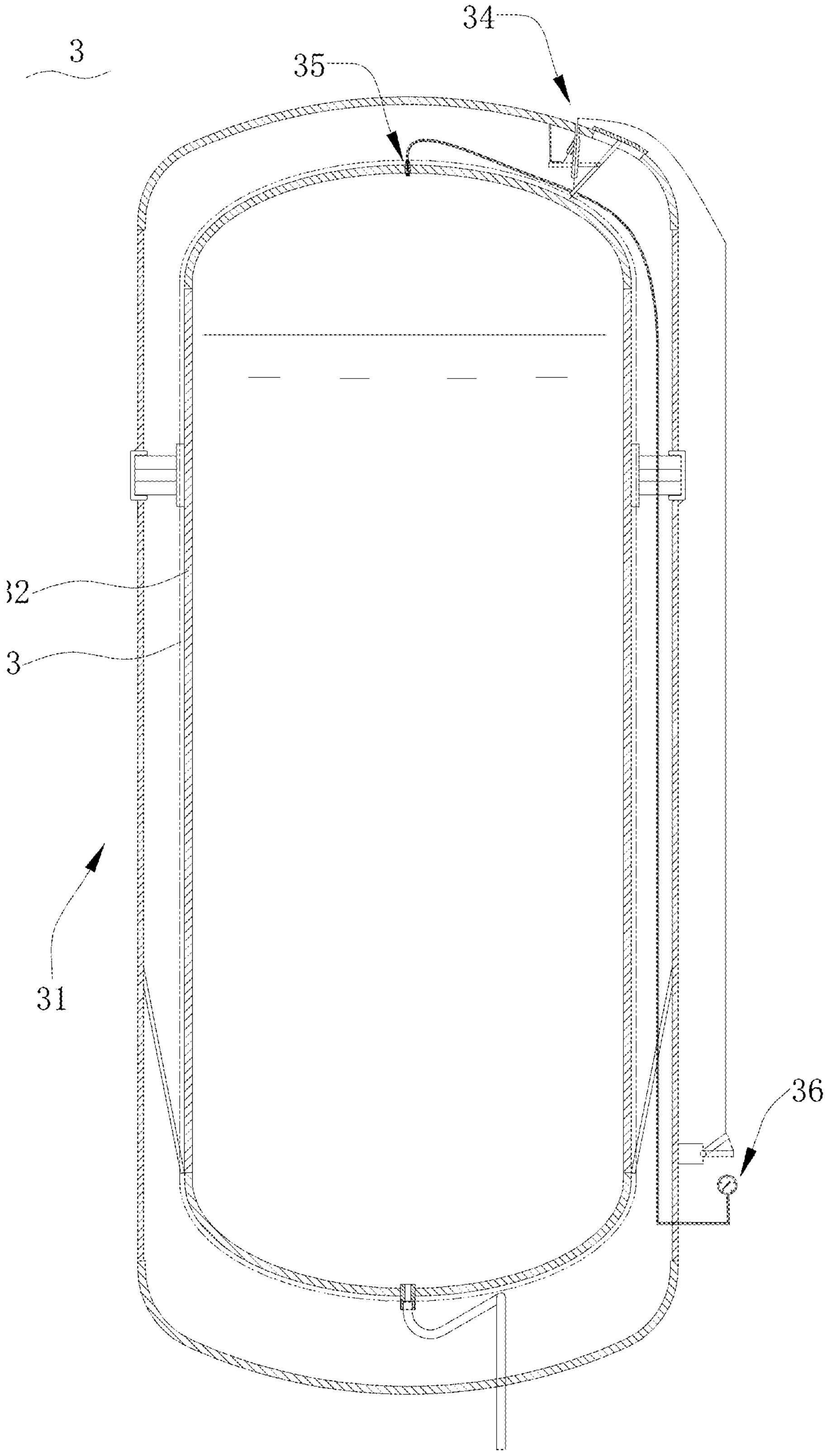
FIG. 4 is a structural schematic illustration of the cryogenic vessel in embodiment III of the present disclosure.

FIG. 4 shows a structural schematic illustration of the cryogenic vessel in this embodiment. Referring to FIG. 4, the cryogenic vessel 3 in this embodiment is a vertical vessel, vertical means that the axis of the cryogenic vessel 3 extends in the vertical direction during use.

Both the axis of the shell 31 and the axis of the inner vessel 32 in this embodiment extend vertically. Other features such as the thermal insulation layer 33, the pressurizing device 34, the pressure measuring device 35 and the pressure display device 36 in this embodiment, can be referred to Embodiment I and will not be described in detail.

Embodiment IV

Figure 5:
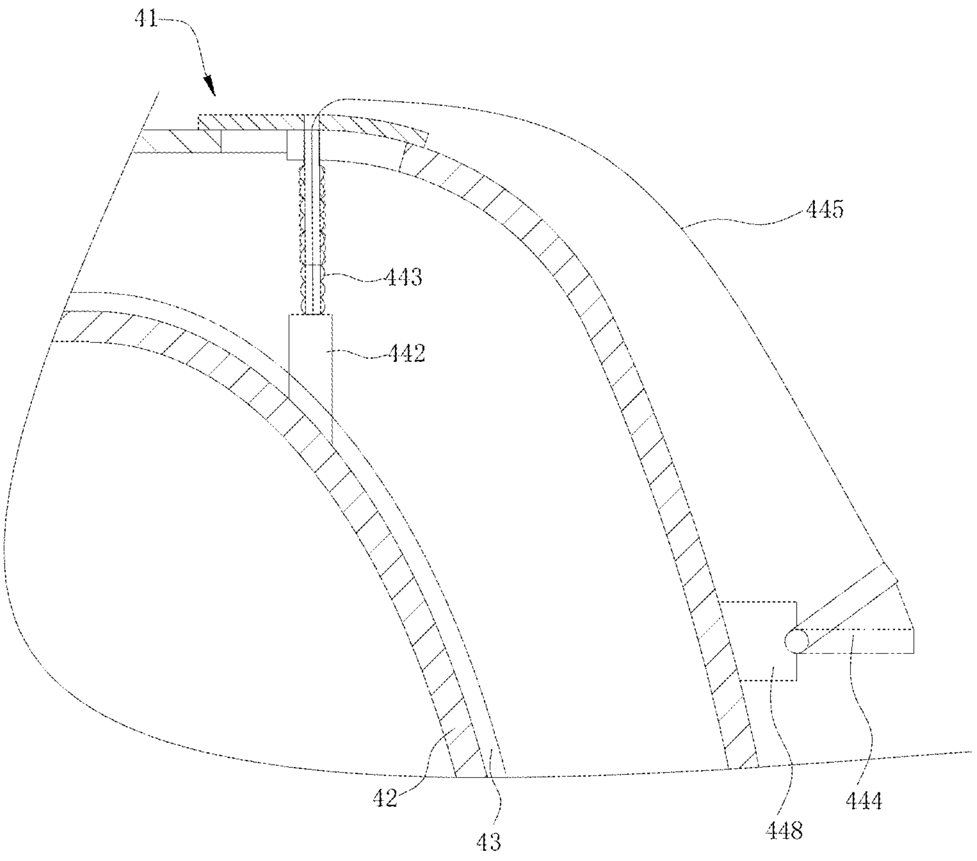
FIG. 5 is a partial structural schematic illustration of the cryogenic vessel in embodiment IV of the present disclosure.

FIG. 5 shows a partial structural schematic illustration of the cryogenic vessel in this embodiment. Referring to FIG. 5, this embodiment is different from Embodiment I in the structure of the pressurizing device.

The pressurizing device includes a protruding member 442, a heat conducting member 443, and a connecting member 445. The heat conducting member 443 is flexible. One end of the heat conducting member 443 is fixedly connected to the shell 41, and another end thereof can move away from or abut against the protruding member 442. That is, one end of the heat conducting member 443 is fixedly connected to the shell 41, and another end thereof is telescopic in the sandwich space. When the heat conducting member 443 is elongated, it contacts with the protruding member 442 to conduct heat. When the heat conducting member 443 is contracted, it is disconnected from the protruding member 442 to terminate heat conduction.

The heat conducting member 443 is made of a low temperature resistant material.

Specifically, the heat conducting member 443 is hollow inside, an end of the heat conducting member close to the shell 41 is open, and an end of the heat conducting member close to the inner vessel 42 is closed. In this embodiment, the heat conducting member 443 is a corrugated pipe.

The heat conducting member 443 is fixedly connected to the inner side of the cover plate.

The connecting member 445 extends from the outside of the shell 41 into the sandwich space and is fixedly connected to the heat conducting member 443, and the connecting member 445 extends outwardly from the shell 41. The connecting member 445 can move under the performance of external force, and drive the heat conducting member 443 to expand and contract, so as to move away from or abut against the protruding member 442.

Specifically, the connecting member 445 extends into the heat conducting member 443 and is connected to the heat conducting member 443 in the form of a rope or a chain. The connecting member 445 is fixedly connected to the end of the heat conducting member close to the inner vessel 42.

Referring to the direction of the view in FIG. 5, the connecting member 445 is fixedly connected to the bottom of the heat conducting member 443 so as to sufficiently ensure that the heat conducting member 443 is separated from the protruding member 442.

The pressurizing device also includes an operating member 444 disposed outside the shell 41. The operating member 444 is rotatable relative to the shell 41, and the operating member 444 is fixedly connected to the connecting member 445 to drive the connecting member 445 into or out of the sandwich space.

In particular, the operating member 444 is rotatably connected to the shell 41 by the fitting member 448. The fitting member 448 is positioned outside the shell 41. One end of the operating member 444 is rotatably connected to the fitting member 448 and another end thereof is fixedly connected to the connecting member 445.

The cryogenic vessel is used as follows:

in an initial state, the heat conducting member 443 is in a contracted state and is disconnected from the protruding member 442.

When pressurization is required, the operating member 444 is rotated upward so that the heat conducting member 443 is opened and the heat conducting member 443 is brought into abut against the protruding member 442.

When the pressure is satisfied, the operating member 444 is rotated so that the heat conducting member 443 is contracted by the connecting member 445 and is disconnected from the protruding member 442, hence heat is no longer transferred to the inner vessel 42.

In this embodiment, the heat conducting member 443 and the protruding member 442 are positioned in the same straight line, and the end face of the heat conducting member 443 is brought into abut against the end face of the protruding member 442. In other embodiments, the heat conducting member 443 and the protruding member 442 may also be disposed in a misaligned manner. When the heat conducting member 443 is elongated, its circumferential side surface abuts against the circumferential side surface of the protruding member 442.

The pressurizing device in this embodiment directly achieves connection and disconnection with the protruding member 442 through the expansion and contraction of the heat conducting member 443, thereby implementing heat conduction and termination of heat conduction between the shell 41 and the inner vessel 42, and implementing the pressurizing function. This pressurization mode does not need additional heat exchanger, and has a simple structure and low cost. Other features of the cryogenic vessel in this embodiment, such as the shell 41, the inner vessel 42, and the thermal insulation layer 43, can be referred to Embodiment I and will not be described in detail.

Embodiment V

Figure 6:
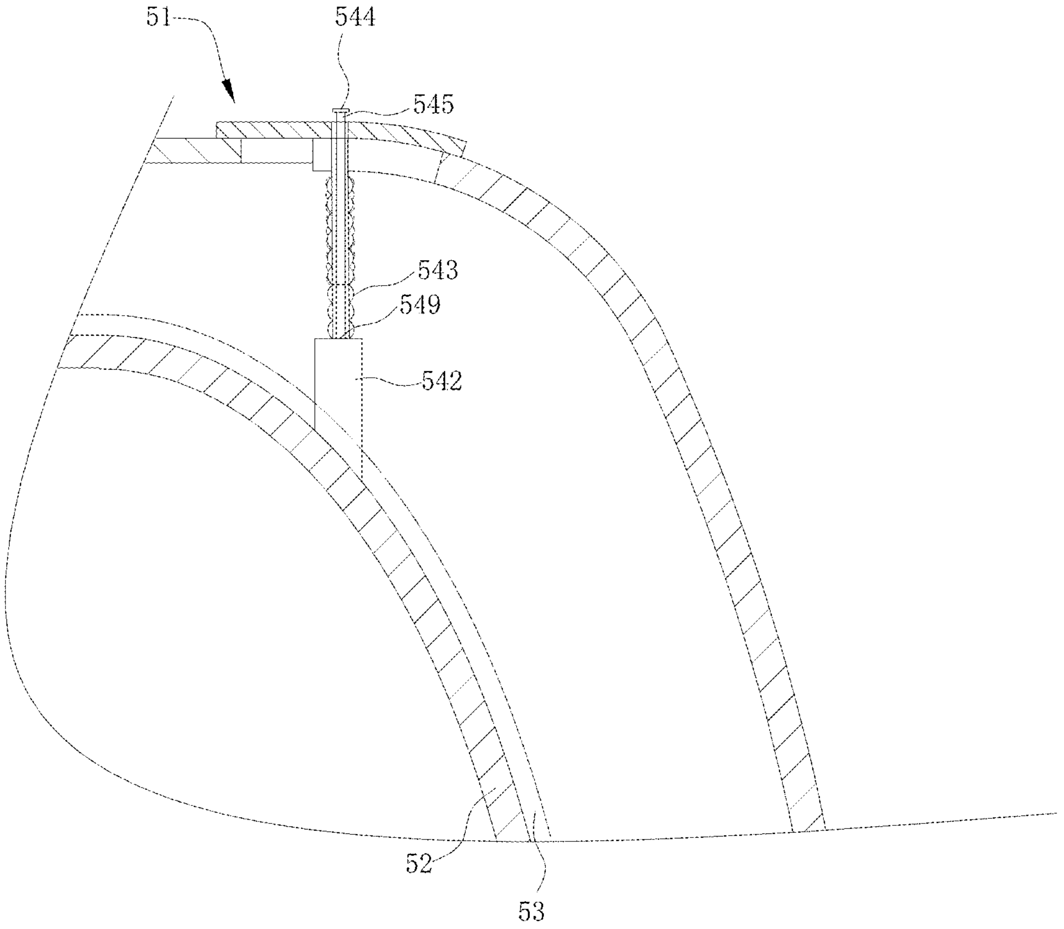
FIG. 6 is a partial structural schematic illustration of the cryogenic vessel in embodiment V of the present disclosure.

FIG. 6 shows a partial structural schematic illustration of the cryogenic vessel in this embodiment. Referring to FIG. 6, this embodiment differs from the Embodiment IV in the structure of the connecting member 545.

The heat conducting member 543 is hollow inside, an end of the heat conducting member close to the shell 51 is open, and an end of the heat conducting member close to the inner vessel 52 is closed. The connecting member 545 is rod-shaped and extends into the heat conducting member 543. The connecting member 545 is made of a low temperature resistant material.

A connecting point between the connecting member 545 and the heat conducting member 543 is located in an area ranging from a center in a length direction of the heat conducting member 543 to a position close to the inner vessel 52.

A baffle plate 549 is arranged in the heat conducting member 543, a periphery of the baffle plate 549 is fixedly connected to an inner wall of heat conducting member 543, and a surface of the baffle plate 549 away from the inner vessel 52 is fixedly connected to the connecting member 545. The baffle plate 549 is made of a low temperature resistant material.

Referring to the direction of view of FIG. 6, the baffle plate 549 in this embodiment is fixedly connected to the bottom of the heat conducting member 543 and closes the end of the heat conducting member 543 close to the inner vessel 52. In other embodiments, the baffle plate 549 may also be disposed in the middle of the heat conducting member 543 and other locations below the middle.

The pressurizing device further includes an operating member 544 provided outside the shell 51, and the operating member 544 is fixedly connected to the end of the connecting member 545 and protrudes from the periphery of the connecting member 545.

The heat conducting member 543 is pushed inward by the operating member 544 so that the heat conducting member 543 is opened and abuts against the protruding member 542. The operating member 544 is pulled outward so that the heat conducting member 543 is contracted and disconnected from the protruding member 542.

The cryogenic vessel is used as follows:

in an initial state, the heat conducting member 543 is in a contracted state and is disconnected from the protruding member 542.

When pressurization is required, the operating member 544 is pressed downward so that the heat conducting member 543 is opened, and the heat conducting member 543 is brought into contact with the protruding member 542.

When the pressure is satisfied, the operating member 544 is pulling up so that the heat conducting member 543 is contracted by the connecting member 545 and disconnected from the protruding member 542, hence heat is no longer transferred to the inner vessel 52.

Other features of the cryogenic vessel in this embodiment, such as the shell 51, the inner vessel 52, and the thermal insulation layer 53, can be referred to Embodiment IV and will not be described in detail.

From the technical solution, it can be seen that the advantages and positive effects of the present disclosure are as follows:

The pressurizing device of the present disclosure creatively achieves the connection between the shell and the inner vessel through a rotatable heat conducting member, realizes the pressurization function by conducting the heat of the shell to the inner vessel and increasing the pressure inside the inner vessel by vaporizing the medium of the inner vessel. The pressurization mode does not need additional heat exchanger and corresponding pipes and valves, and has a simple structure and low cost.

The pressurizing device of the present disclosure creatively and directly realizes the contact and disconnection between the pressurizing device and the protruding member through the expansion and contraction of the heat conducting member, thereby implementing heat conduction and termination of heat conduction between the shell and the inner vessel, and implementing the pressurizing function. This pressurization mode does not need additional heat exchanger, and has a simple structure and low cost.

While the present disclosure has been described with reference to several exemplary embodiments, it should be understood that the terms used herein are illustrative and exemplary and are not limiting. Since the present disclosure can be embodied in various forms without departing from the spirit or essence of the present disclosure, it should therefore be understood that the foregoing embodiments are not limited to any of the foregoing details, but are to be interpreted broadly within the spirit and scope defined by the appended claims, so that all variations and modifications falling within the scope of the claims or their equivalents are to be covered by the appended claims.

What is claimed is:

1. A pressurizing device for a cryogenic vessel, the cryogenic vessel comprising a shell, an inner vessel located in the shell, and a thermal insulation layer arranged on a periphery of the inner vessel, a gap being provided between the shell and the inner vessel to form a sandwich space in a vacuum environment, and the thermal insulation layer is spaced apart from the shell, wherein the pressurizing device comprises:

a fixing member located in the sandwich space, fixedly connected to the shell and spaced apart from the inner vessel;

a protruding member located in the sandwich space, fixedly connected to the inner vessel and protruding out of the thermal insulation layer; the protruding member being spaced apart from the fixing member; and the protruding member is made of a low temperature resistant material;

a heat conducting member rotatably connected to the fixing member; and the heat conducting member being made of a low temperature resistant material;

an operating member arranged outside the shell and rotatable relative to the shell; and a connecting member, one end of the connecting member being fixedly connected to the operating member, another end of the connecting member extending into the sandwich space to be fixedly connected to the heat conducting member, and the connecting member capable of driving the heat conducting member to rotate to abut against the protruding member or rotate to be spaced apart from the protruding member in response to rotation of the operating member.

2. The pressurizing device according to claim 1, wherein the connecting member extends into the sandwich space through a mounting member; and the mounting member is located in the sandwich space and is fixed and sealed with the shell, the mounting member is resilient and capable of telescoping within the sandwich space, the connecting member passes through the mounting member and is fixedly connected to an end of the mounting member away from the shell.

3. The pressurizing device according to claim 2, wherein the mounting member is a corrugated pipe.

4. The pressurizing device according to claim 1, wherein the pressurizing device further comprises a limiting member located in the sandwich space; the limiting member and the protruding member are arranged on opposite two sides of the fixing member, so that the heat conducting member rotates between the limiting member and the protruding member; and the limiting member is fixedly connected to the shell.

5. The pressurizing device according to claim 4, wherein the limiting member comprises a fixing part fixedly connected to the shell and a stopping part configured to abut against the heat conducting member.

6. The pressurizing device according to claim 4, wherein the pressurizing device further comprises a positioning block arranged outside the shell, the positioning block being provided with a first positioning groove and a second positioning groove; and when the operating member is rotated to snap into the first positioning groove, the heat conducting member abuts against the limiting member, and when the operating member is rotated to snap into the second positioning groove, the heat conducting member abuts against the protruding member.

7. The pressurizing device according to claim 1, wherein the pressurizing device comprises:

a pressure measuring device being in communication with an interior of the inner vessel to measure pressure in the inner vessel; and a pressure display device connected to the pressure measuring device to receive and display the pressure in the inner vessel.

8. The pressurizing device according to claim 1, wherein the operating member is rotatably connected to the shell by means of a fitting member, wherein the fitting member is fixed outside the shell, one end of the operating member is rotatably connected to the fitting member, and another end of the operating member is fixedly connected to the connecting member.

9. A pressurizing device for a cryogenic vessel, the cryogenic vessel comprising a shell, an inner vessel located in the shell, and a thermal insulation layer arranged on a periphery of the inner vessel, a gap being provided between the shell and the inner vessel to form a sandwich space in a vacuum environment, and the thermal insulation layer is spaced apart from the shell, wherein the pressurizing device comprises:

a protruding member located in the sandwich space, fixedly connected to the inner vessel and protruding out of the thermal insulation layer;

a heat conducting member configured to be flexible, one end of the heat conducting member being fixedly connected to the shell, and another end of the heat conducting member capable of moving away from the protruding member or abutting the protruding member; and the heat conducting member is made of a low temperature resistant material; and a connecting member extending into the sandwich space from outside of the shell and being fixedly connected to the heat conducting member, and the connecting member extending outward from the shell;

wherein the connecting member is capable of approaching or moving away from the shell under performance of external force, and drives the heat conducting member to expand and contract away from the protruding member or abut against the protruding member.

10. The pressurizing device according to claim 9, wherein the heat conducting member is hollow inside, an end of the heat conducting member close to the shell is open, and an end of the heat conducting member close to the inner vessel is closed;

wherein the connecting member is in a form of a rope or a chain, and extends into the heat conducting member to be connected to the heat conducting member; and wherein the connecting member is fixedly connected to the end of the heat conducting member close to the inner vessel.

11. The pressurizing device according to claim 10, wherein the pressurizing device further comprises an operating member disposed outside the shell; the operating member capable of rotating relative to the shell, and the operating member being fixedly connected to the connecting member to drive the connecting member into or out of the sandwich space.

12. The pressurizing device according to claim 11, wherein the operating member is rotatably connected to the shell by means of a fitting member, wherein the fitting member is fixed outside the shell, one end of the operating member is rotatably connected to the fitting member, and another end of the operating member is fixedly connected to the connecting member.

13. The pressurizing device according to claim 9, wherein the heat conducting member is hollow inside, an end of the heat conducting member close to the shell is open, and an end of the heat conducting member close to the inner vessel is closed, wherein the connecting member is in a form of a rod and extends into the heat conducting member, and the connecting member is made of a low temperature resistant material; and wherein a connecting point between the connecting member and the heat conducting member is located in an area ranging from a center in a length direction of the heat conducting member to a position close to the inner vessel.

14. The pressurizing device according to claim 13, wherein a baffle plate is arranged in the heat conducting member, wherein a periphery of the baffle plate is fixedly connected to an inner wall of the heat conducting member to close the end of the heat conducting member close to the inner vessel, and wherein a surface of the baffle plate away from the inner vessel is fixedly connected to the connecting member; and wherein the baffle plate is made of a low temperature resistant material.

15. The pressurizing device according to claim 13, wherein the pressurizing device further comprises an operating member arranged outside the shell, the operating member being fixedly connected to an end of the connecting member and protruding from a periphery of the connecting member.

16. A cryogenic vessel comprising a shell, an inner vessel located in the shell, a thermal insulation layer arranged on a periphery of the inner vessel, and a pressurizing device, wherein a gap is provided between the shell and the inner vessel to form a sandwich space in a vacuum environment, the thermal insulation layer is spaced apart from the shell, and wherein the pressurizing device comprises:

a fixing member located in the sandwich space, fixedly connected to the shell and spaced apart from the inner vessel;

a protruding member located in the sandwich space, fixedly connected to the inner vessel and protruding out of the thermal insulation layer; the protruding member being spaced apart from the fixing member; and the protruding member is made of a low temperature resistant material;

a heat conducting member rotatably connected to the fixing member; and the heat conducting member being made of a low temperature resistant material;

an operating member arranged outside the shell and rotatable relative to the shell; and a connecting member, one end of the connecting member being fixedly connected to the operating member, another end of the connecting member extending into the sandwich space to be fixedly connected to the heat conducting member, and the connecting member capable of driving the heat conducting member to rotate to abut against the protruding member or rotate to be spaced apart from the protruding member in response to rotation of the operating member.

17. The cryogenic vessel according to claim 16, wherein the shell is made of a low temperature resistant material.

18. The cryogenic vessel according to claim 16, wherein the shell comprises a outer housing provided with at least an opening and a cover plate, wherein the cover plate is one-to one corresponding to the opening, wherein the cover plate is covered at a corresponding opening, the cover plate is made of a low temperature resistant material, and the fixing member is fixedly connected to the cover plate.

19. The cryogenic vessel according to claim 18, wherein the cover plate has a circular or square cross section.

20. The cryogenic vessel according to claim 16, wherein a plurality of pressurizing devices are arranged at intervals along a circumferential direction of the shell; and wherein the plurality of pressurizing devices are arranged at intervals along an axial direction of the shell.

* * * * *